US012380669B2

(12) United States Patent
Ding et al.

(10) Patent No.: US 12,380,669 B2
(45) Date of Patent: Aug. 5, 2025

(54) METHOD FOR CARGO COUNTING, COMPUTER EQUIPMENT, AND STORAGE MEDIUM

(71) Applicant: VisionNav Robotics USA Inc., Acworth, GA (US)

(72) Inventors: Hang Ding, Guangdong (CN); Yujie Lu, Guangdong (CN); Bingchuan Yang, Guangdong (CN); Mu Fang, Guangdong (CN)

(73) Assignee: VisionNav Robotics USA Inc., Acworth, GA (US)

( * ) Notice: Subject to any disclaimer, the term of this patent is extended or adjusted under 35 U.S.C. 154(b) by 316 days.

(21) Appl. No.: 17/869,092

(22) Filed: Jul. 20, 2022

(65) Prior Publication Data

US 2023/0196719 A1 Jun. 22, 2023

(30) Foreign Application Priority Data

Dec. 21, 2021 (CN) .......................... 202111586634.6

(51) Int. Cl.
*G06V 10/46* (2022.01)
*G01S 17/89* (2020.01)
*G06T 7/11* (2017.01)

(52) U.S. Cl.
CPC ............ *G06V 10/476* (2022.01); *G01S 17/89* (2013.01); *G06T 7/11* (2017.01); *G06T 2207/10028* (2013.01)

(58) Field of Classification Search
CPC ......... G06V 10/476; G01S 17/89; G06T 7/11; G06T 2207/10028; G06T 2207/30242; G06Q 10/087; G06Q 10/08
See application file for complete search history.

(56) References Cited

U.S. PATENT DOCUMENTS

2010/0017407 A1* 1/2010 Beniyama ........... G06F 16/5854
  707/E17.016
2021/0133666 A1* 5/2021 Eckman .................... G06T 7/62

FOREIGN PATENT DOCUMENTS

CN     109886961 A    6/2019
CN     112258452 A    1/2021
(Continued)

OTHER PUBLICATIONS

D. J. Natale, et al., "Point cloud processing strategies for noise filtering, structural segmentation, and meshing of ground-based 3D Flash LIDAR images," 2010 IEEE 39th Applied Imagery Pattern Recognition Workshop (AIPR), Washington, DC, USA, 2010, pp. 1-8, doi: 10.1109/AIPR.2010.5759695. (Year: 2010).*

(Continued)

*Primary Examiner* — Matthew C Bella
*Assistant Examiner* — Janice E. Vaz
(74) *Attorney, Agent, or Firm* — Getech Law LLC; Jun Ye

(57) ABSTRACT

A method for cargo counting, a computer equipment, and a storage medium are provided in the disclosure. The method includes the following. Three-dimensional (3D) point cloud data of a set of cargoes within a preset placement region is obtained based on a cargo-counting instruction. Whether the set of cargoes are in a first placement state is determined according to the 3D point cloud data. Based on a determination that the set of cargoes are in the first placement state, a quantity of the set of cargoes is calculated.

18 Claims, 5 Drawing Sheets

(56) References Cited

FOREIGN PATENT DOCUMENTS

| CN | 112132523 B | | 7/2021 |
|---|---|---|---|
| CN | 113362385 A | * | 9/2021 |
| JP | 2010023950 A | | 2/2010 |
| JP | 2021056765 A | | 4/2021 |
| WO | 2021233029 A1 | | 11/2021 |

OTHER PUBLICATIONS

Examination of a method for dividing a 3D point group composed of multiple solid objects, 12 pages (With brief English explanation).
JP2022140440—Notice of Reasons for Refusal mailed on Jun. 16, 2023, 8 pages.
EPO, Extended European Search Report for European Patent Application No. 22185742.8, Jan. 2, 2023, 9 pages.

* cited by examiner

METHOD FOR CARGO COUNTING, COMPUTER EQUIPMENT, AND STORAGE MEDIUM

CROSS-REFERENCE TO RELATED APPLICATION(S)

This application claims priority under 35 U.S.C. § 119(a) to Chinese Patent Application No. 202111586634.6, filed Dec. 21, 2021, the entire disclosure of which is hereby incorporated by reference.

TECHNICAL FIELD

This application relates to the technical field of cargo counting, and particularly to a method for cargo counting, a computer equipment, and a storage medium.

BACKGROUND

With the development of cargo counting technology, counting of cargoes in full cases has become easy. At present, bulk-cargoes, however, still rely on manual counting. Manually counting bulk-cargoes is generally time-consuming and labor-intensive due to a relatively large quantity and variety of bulk-cargoes, resulting in a relatively low counting efficiency.

SUMMARY

In view of this, it is necessary to provide a method for cargo counting, a computer equipment, and a computer-readable storage medium, which can solve the above technical problem of low counting efficiency of bulk-cargoes.

In a first aspect, the disclosure provides a method for cargo counting. The method for cargo counting includes the following. Three-dimensional (3D) point cloud data of a set of cargoes within a preset placement region is obtained based on a cargo-counting instruction. Whether the set of cargoes are in a first placement state is determined according to the 3D point cloud data. Based on a determination that the set of cargoes are in the first placement state, a quantity of the set of cargoes is calculated.

In a second aspect, the disclosure further provides a computer equipment. The computer equipment includes a processor and a memory. The memory is coupled to the processor and stores computer programs which, when executed by the processor, cause the processor to: obtain 3D point cloud data of a set of cargoes within a preset placement region based on a cargo-counting instruction; determine whether the set of cargoes are in a first placement state according to the 3D point cloud data; and calculate a quantity of the set of cargoes based on a determination that the set of cargoes are in the first placement state.

In a third aspect, the disclosure further provides a non-transitory computer-readable storage medium. The non-transitory computer-readable storage medium stores computer programs which, when executed by a processor, cause the processor to carry out the following actions. 3D point cloud data of a set of cargoes within a preset placement region is obtained based on a cargo-counting instruction. Whether the set of cargoes are in a first placement state is determined according to the 3D point cloud data. Based on a determination that the set of cargoes are in the first placement state, a quantity of the set of cargoes is calculated.

According to the method for cargo counting, the computer equipment, and the storage medium of the disclosure, the 3D point cloud data of the set of cargoes within the preset placement region is obtained based on the cargo-counting instruction. Whether the set of cargoes are in the first placement state is determined according to the 3D point cloud data. If the set of cargoes are in the first placement state, the quantity of the set of cargoes is calculated. As such, the quantity of bulk-cargoes can be calculated based on the obtained point cloud data of the set of cargoes, thereby improving efficiency of counting of the bulk-cargoes.

DETAILED DESCRIPTION

In order to describe objects, technical solutions, and advantages of the disclosure more clearly, the disclosure will be described in detail below with reference to accompanying drawings and implementations. It should be understood that, the implementations described below are merely used to explain the disclosure, and should not be construed as limiting the disclosure.

Figure 1:
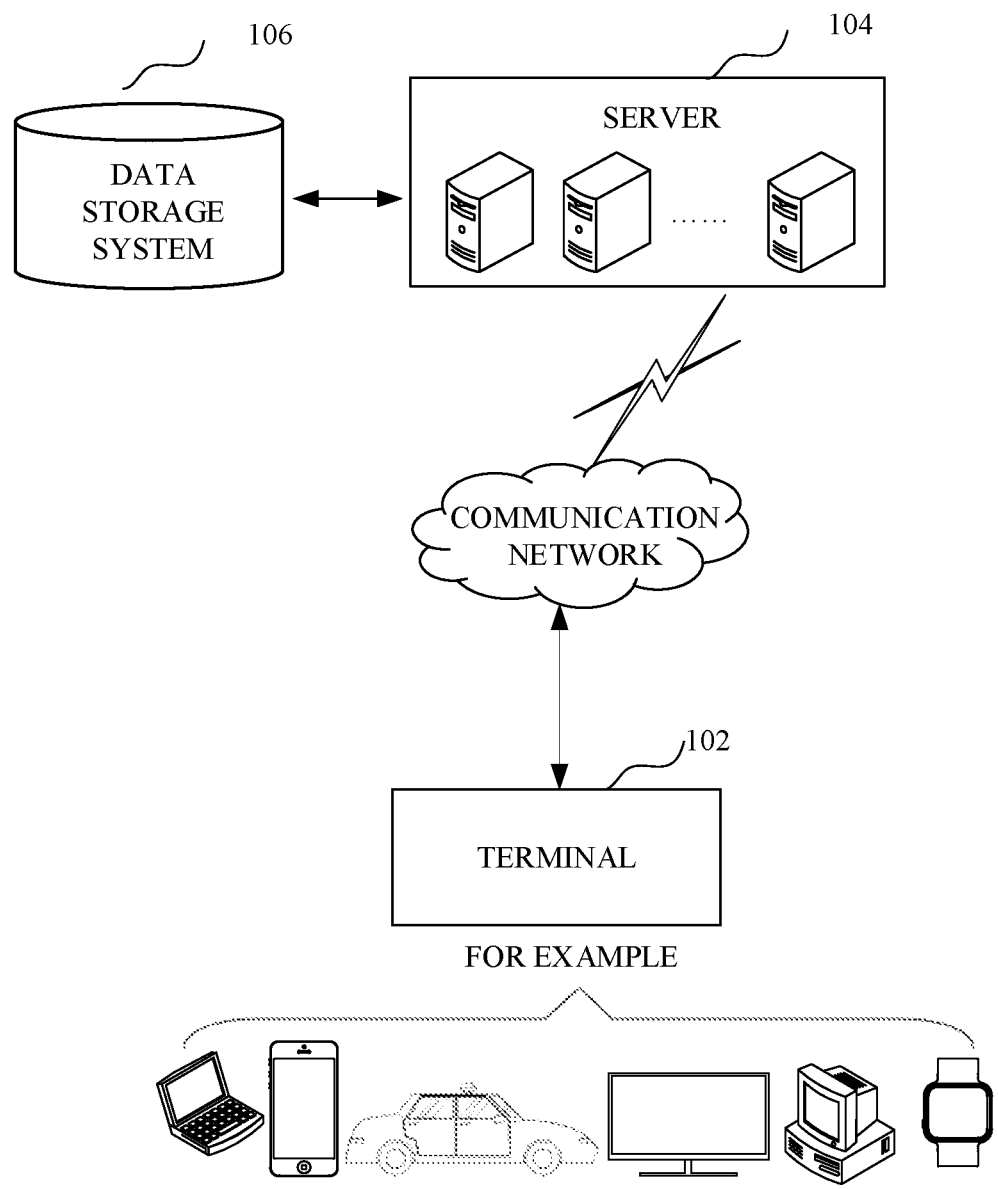
FIG. 1 is an application scenario diagram illustrating a method for cargo counting according to an implementation of the disclosure.

A method for cargo counting of implementations of the disclosure may be applicable to an application scenario illustrated in FIG. 1. A terminal 102 is communicatively connected with a server 104 via a network, and the server 104 is communicatively connected with a data storage system 106. The data storage system 106 can store data that the server 104 needs to process. The data storage system 106 may be integrated with the server 104, or may be disposed in cloud or integrated with other network servers. The server 104 can obtain three-dimensional (3D) point cloud data of a set of cargoes within a preset placement region, where the 3D point cloud data is collected based on a cargo-counting instruction and stored in the terminal 102; determine whether the set of cargoes are in a first placement state according to the 3D point cloud data; and calculate a quantity of the set of cargoes if the set of cargoes are in the first placement state. The terminal 102 may be, but is not limited to, various personal computers, notebook computers, smart phones, tablet computers, Internet of Things (IoT) devices, and portable wearable devices. The IoT device may be a smart speaker, a smart TV, a smart air conditioner, a smart on-board device, etc. The portable wearable device may be a smart watch, a smart bracelet, a head-mounted device, etc. The server 104 may be implemented by an independent server or a server cluster composed of multiple servers.

Figure 2:
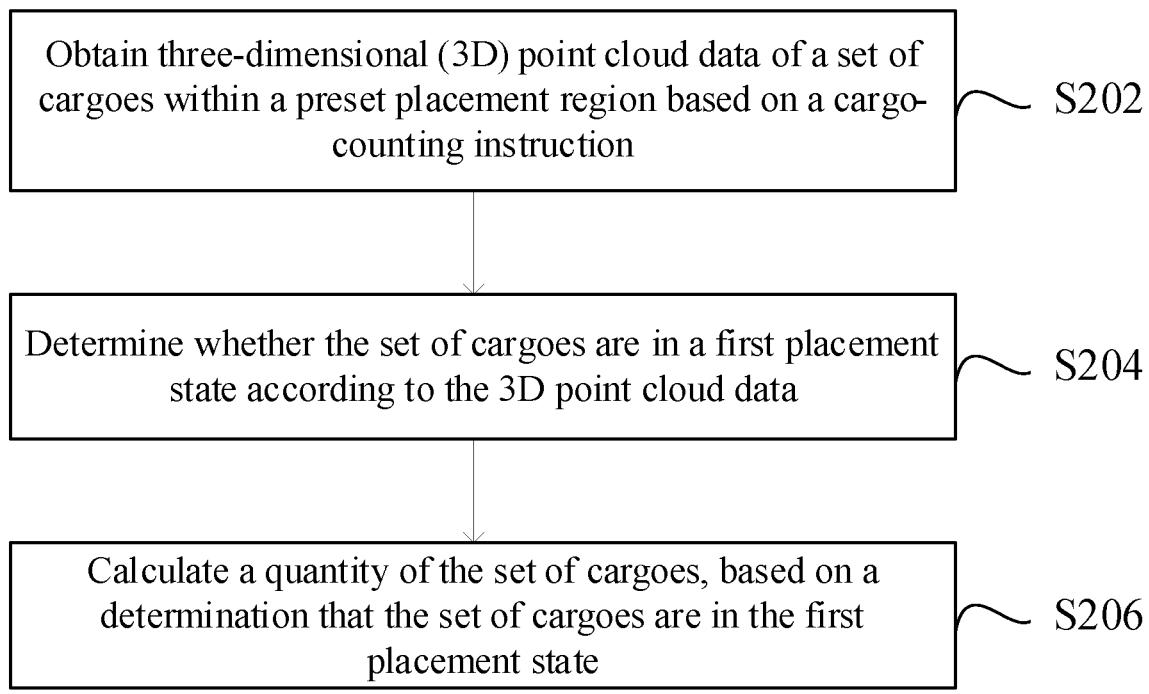
FIG. 2 is a schematic flowchart illustrating a method for cargo counting according to an implementation of the disclosure.
Figure 3:
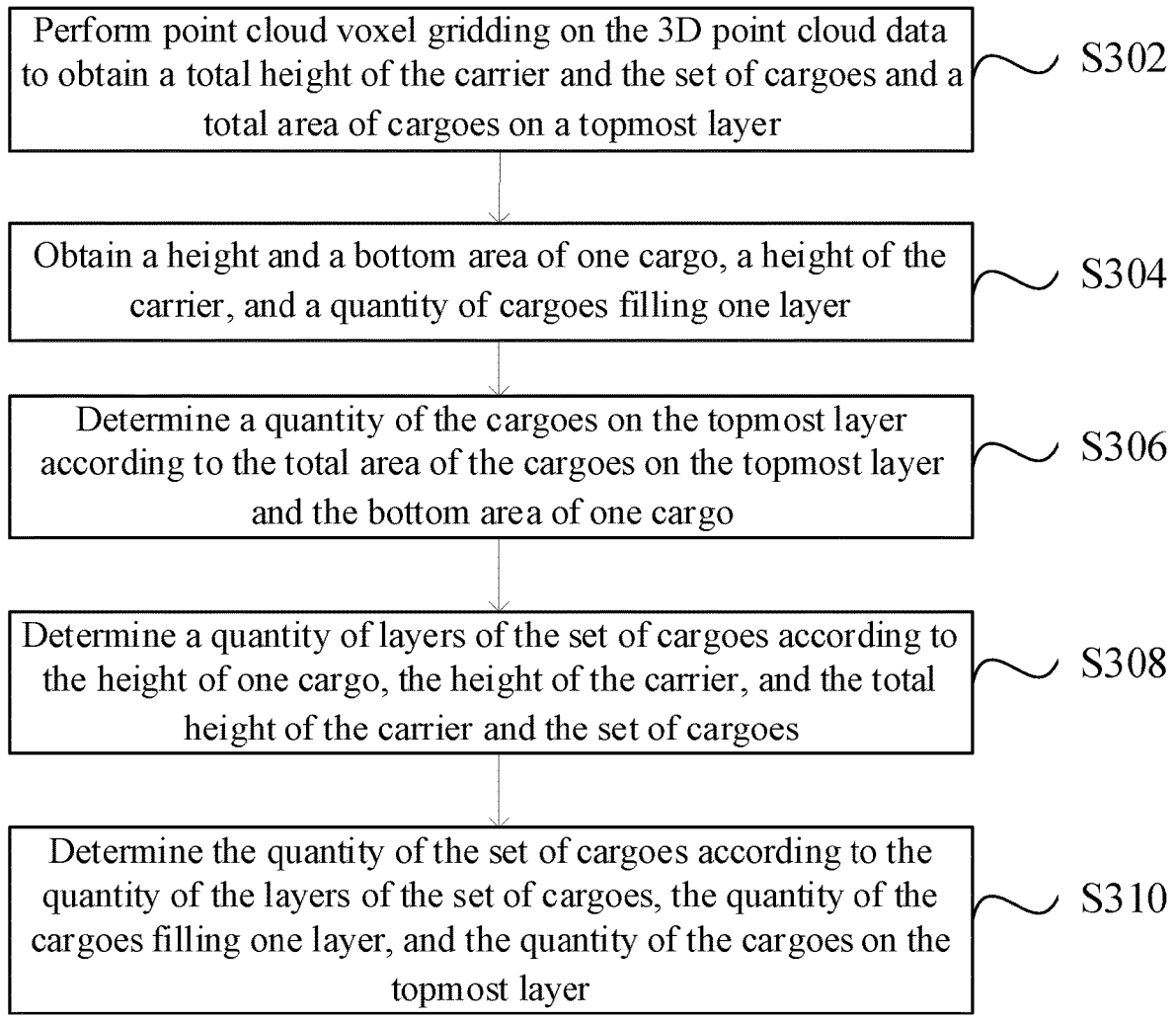
FIG. 3 is a schematic flowchart illustrating calculating of a quantity of a set of cargoes according to an implementation of the disclosure.
Figure 4:
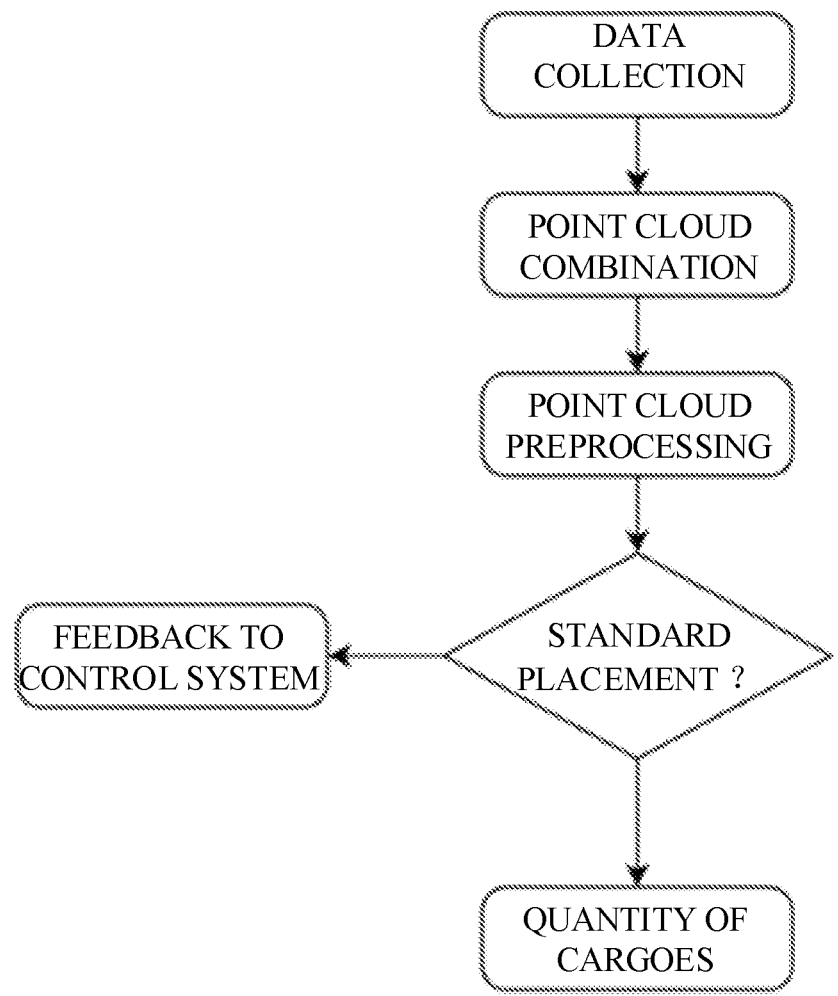
FIG. 4 is a schematic flowchart illustrating a method for cargo counting according to another implementation of the disclosure.

In implementations of the disclosure, a method for cargo counting is provided. For example, the method is applied to the server 104 in FIG. 1, as illustrated in FIG. 2, the method includes the following.

At 202, 3D point cloud data of a set of cargoes within a preset placement region is obtained based on a cargo-counting instruction.

The cargo herein refers to a cargo to-be-counted such as a bulk-cargo. The preset placement region herein refers to a predetermined region where the cargo is placed. The 3D point cloud data herein refers to a collection of vectors in a 3D coordinate system, and is scanned and recorded by a scanner in a form of points. Each of the points contains a 3D coordinate. Part of the points may further contain color information or reflection intensity information, where the color information refers to spatial color information, and the reflection intensity information refers to information of different intensities obtained as a result reflection when a laser scans different planes during scanning of the scanner. The 3D point cloud data can be obtained by scanning cargoes within the preset placement region.

Specifically, a preset placement region for placing cargoes is provided, and a 3D laser scanner(s) is arranged around the preset placement region. After cargoes are placed into the preset placement region, the server 104 (e.g., a processor of a central control system) obtains a cargo-counting instruction, controls the 3D laser scanner(s) to scan the cargoes within the preset placement region according to the cargo-counting instruction, and obtains 3D point cloud data of the cargoes.

At 204, whether the set of cargoes are in a first placement state is determined according to the 3D point cloud data.

The first placement state herein refers to that the set of cargoes are at a position in the preset placement region which is conducive to cargo counting. That is, the set of cargoes is in standard placement, for example, the set of cargoes completely fall into the preset placement region in a preset standard posture. As an implementation, the preset standard posture means that a length direction of the set of cargoes is parallel to that of the preset placement region, and a width direction of the set of cargoes is parallel to that of the preset placement region. If part of the set of cargoes is beyond the boundary of the preset placement region or the set of cargoes do not fall into the preset placement region in the preset standard posture, the set of cargoes are determined to be not in the first placement state.

Specifically, the processor obtains 3D point cloud data of a set of cargoes within a preset placement region, and then determines, according to the 3D point cloud data, whether the set of cargoes are placed at a position that is conducive to cargo counting.

At 206, if the set of cargoes are in the first placement state, a quantity of the set of cargoes is calculated.

Specifically, if the set of cargoes are in the first placement state, the processor analyzes the 3D point cloud data to calculate the quantity of the set of cargoes.

According to the method for cargo counting, the 3D point cloud data of the set of cargoes within the preset placement region is obtained based on the cargo-counting instruction. Whether the set of cargoes are in the first placement state is determined according to the 3D point cloud data. If the set of cargoes are in the first placement state, the quantity of the set of cargoes is calculated. As such, the quantity of the set of cargoes can be calculated based on the obtained 3D point cloud data of the set of cargoes, thereby improving efficiency of counting of the set of cargoes.

In an implementation, the 3D point cloud data of the set of cargoes within the preset placement region is obtained based on the cargo-counting instruction as follows. Candidate point cloud data of the set of cargoes within the preset placement region is obtained with at least two 3D laser scanners. The candidate point cloud data obtained by each of the at least two 3D laser scanners are combined to obtain the 3D point cloud data of the set of cargoes.

The 3D laser scanner refers to a device composed of a multi-line laser and a rotating component to collect information of an object in the real world, such as a shape and an appearance of the object. The 3D laser scanner is mainly configured to scan the set of cargoes within the preset placement region to obtain candidate point cloud data of the set of cargoes. The candidate point cloud data refers to 3D point cloud data of the set of cargoes within the preset placement region which is collected by each of the 3D laser scanners. Point cloud stitching is performed on candidate point cloud data of the set of cargoes within the preset placement region collected by the at least two 3D laser scanners, to obtain complete 3D point cloud data of the set of cargoes. Point cloud stitching is mainly to perform spatial transformation on different point clouds and to stitch multiple point cloud data into a globally consistent 3D point cloud model.

In a possible implementation, the at least two 3D laser scanners include a first scanner and at least one second scanner. The candidate point cloud data of the set of cargoes within the preset placement region is obtained with the at least two 3D laser scanners as follows. Candidate point cloud data of the set of cargoes within the preset placement region is obtained with the first scanner, where the first scanner is a reference scanner. Candidate point cloud data of the set of cargoes within the preset placement region is obtained with each of the at least one second scanner.

In a possible implementation, the candidate point cloud data obtained by each of the at least two 3D laser scanners are combined to obtain the 3D point cloud data of the set of cargoes as follows. For each of the at least one second scanner, a position-and-attitude parameter of the second scanner relative to the first scanner is obtained. Based on the position-and-attitude parameter of each of the at least one second scanner relative to the first scanner, translation-and-rotation transformation is performed on the candidate point cloud data of the set of cargoes within the preset placement region obtained by each of the at least one second scanner to obtain 3D point cloud data in a coordinate system of the first scanner. All 3D point cloud data in the coordinate system of the first scanner and the candidate point cloud data of the set of cargoes within the preset placement region obtained by the first scanner are combined, to obtain the 3D point cloud data of the set of cargoes.

In a possible implementation, the processor obtains candidate point cloud data of the set of cargoes within the preset placement region collected by at least two 3D laser scanners, where the at least two 3D laser scanners include a first scanner serving as a reference scanner and at least one second scanner. The processor obtains a position-and-attitude parameter of each of the at least one second scanner relative to the reference scanner. Based on the obtained position-and-attitude parameter of each of the at least one second scanner relative to the reference scanner, the processor performs translation-and-rotation transformation on the candidate point cloud data of the set of cargoes within the preset placement region collected by each of the at least one second scanner, to obtain 3D point cloud data in a coordinate system of the reference scanner. The processor combines all 3D point cloud data in the coordinate system of the reference scanner and the candidate point cloud data of the set of cargoes within the preset placement region collected by the reference scanner, to obtain a complete 3D point cloud data of the set of cargoes.

As an example, the at least two 3D laser scanners include a first scanner serving as a reference scanner and a second scanner. The processor obtains (3D) candidate point cloud data of the set of cargoes within the preset placement region collected by the first scanner and candidate point cloud data of the set of cargoes within the preset placement region collected by the second scanner. The processor obtains a position-and-attitude parameter of the second scanner relative to the first scanner. Based on the obtained position-and-attitude parameter, the processor performs translation-and-rotation transformation on the candidate point cloud data of the set of cargoes within the preset placement region collected by the second scanner. The processor combines the candidate point cloud data after the translation-and-rotation transformation and the candidate point cloud data of the set of cargoes within the preset placement region collected by the first scanner, to obtain a complete 3D point cloud data of the set of cargoes.

In these implementations, 3D candidate point cloud data of the set of cargoes within the placement region can be obtained, and all 3D candidate point cloud data in a unified coordinate system are combined into a complete 3D point cloud data of the set of cargoes. As such, an accurate point cloud model can be obtained, thereby improving accuracy of counting of the set of cargoes.

In an implementation, whether the set of cargoes are in the first placement state is determined according to the 3D point cloud data as follows. The 3D point cloud data is projected onto a ground plane to obtain a statistics-based grid map. Straight line detection is performed on the grid map to obtain multiple straight line equations. On condition that a straight line slope of each of the multiple straight line equations is equal to 0 or 1, the set of cargoes are determined to be in the first placement state.

The grid map herein is a graph made up of many small squares. A position and a color value of each of the small squares in the grid map can reflect change in color shading. The grid map is mainly used to analyze 3D point cloud data. In an image space x-y, a straight line in a Cartesian coordinate system can be expressed as $y=kx+b$, and $y=kx+b$ is also called "straight line equation", where k is a parameter representing a slope of the straight line (i.e., straight line slope), and b is a parameter representing an intercept of the straight line (i.e., straight line intercept). The straight line equation is obtained by performing straight line detection on the grid map. If the straight line slope of the straight line equation is 0, it means that a length direction of the set of cargoes is parallel to that of the preset placement region, and if the straight line slope of the straight line equation is 1, it means that a width direction of the set of cargoes is parallel to that of the preset placement region.

Specifically, the processor projects 3D point cloud data onto a ground plane (e.g., the Z axis of the 3D point cloud data is set to 0) to obtain a grid map. The processor processes the grid map through a Hough straight line detection algorithm to obtain multiple straight line equations, and determines a straight line slope based on each of the straight line equations. If the straight line slope of each of the straight line equations is equal to 0 or 1, the processor determines that the set of cargoes are in the first placement state. The Hough straight line detection algorithm is an algorithm for image processing, and is one of basic methods for detecting geometric shapes (e.g., a straight line) from an image. The Hough straight line detection algorithm can convert any straight line into a parameter space, which can simplify a straight line detection problem in an image space to a point detection problem in the parameter space. For example, any straight line on a plane can be expressed as $y=kx+b$, and accordingly, any straight line can be expressed as a point (k, b) in a parameter space. In addition to the Hough straight line detection algorithm, other algorithms capable of converting any straight line into the parameter space may also be adopted to process the grid map.

In these implementations, a placement position of the set of cargoes can be determined, which can effectively reduce an error rate in calculation of the total quantity of the cargoes.

In an implementation, the set of cargoes are carried on a carrier. The 3D point cloud data of the set of cargoes is obtained as follows. The 3D point cloud data of the carrier and the set of cargoes is obtained. The quantity of the set of cargoes is calculated as follows. A height and a bottom area of one cargo, a height of the carrier, a quantity of cargoes filling one layer, a total height of the carrier and the set of cargoes, and a total area of cargoes on a topmost layer are determined. Whether the total area of the cargoes on the topmost layer is less than an area threshold is determined, where the area threshold is obtained by multiplying the bottom area of one cargo and the quantity of the cargoes filling one layer. Based on a determination that the total area of the cargoes on the topmost layer is less than the area threshold, the quantity of the set of cargoes is determined according to the height and the bottom area of one cargo, the height of the carrier, the quantity of the cargoes filling one layer, the total height of the carrier and the set of cargoes, and the total area of the cargoes on the topmost layer. Based on a determination that the total area of the cargoes on the topmost layer is equal to the area threshold, the quantity of the set of cargoes is determined according to the height of one cargo, the height of the carrier, the quantity of the cargoes filling one layer, and the total height of the carrier and the set of cargoes.

It should be noted that, in the disclosure, each layer other than the topmost layer is full of cargoes, and the topmost layer may or may not be full of cargoes. Moreover, a maximum quantity of cargoes allowed to be placed on each layer is fixed (if placed correctly). In other words, for each layer, a quantity of cargoes filling one layer (or called "a quantity of cargoes filling a whole layer") is the same. If the topmost layer is not full of cargoes, a quantity of cargoes on the topmost layer is less than a quantity of cargoes filling a whole layer, and accordingly, a total area of the cargoes on the topmost layer is less than a total area of the cargoes filling a whole layer. Conversely, if the topmost layer is full of cargoes, the quantity of the cargoes on the topmost layer is equal to the quantity of the cargoes filling a whole layer, and accordingly, the total area of the cargoes on the topmost layer is equal to the total area of the cargoes filling a whole layer. The area threshold of the disclosure is obtained by multiplying a bottom area of one cargo by the quantity of the cargoes filling a whole layer, which represents the total area of the cargoes filling a whole layer. Based on the above, if the total area of the cargoes on the topmost layer is less than the area threshold, it means that the topmost layer is not full of cargoes; if the total area of the cargoes on the topmost layer is equal to the area threshold, it means that the topmost layer is full of cargoes.

The technical solution of the disclosure is applicable to a scenario of counting of a cargo(es) stacked on one carrier, for example, a scenario where multiple cargoes are stacked on one carrier. In addition, in order to reduce an error rate of counting, a posture of cargoes needs to meet requirements. Specifically, multiple cargoes stacked on the carrier need to completely fall into the preset placement region, and the cargoes are in the first placement state.

In an implementation, the quantity of the set of cargoes is determined according to the height and the bottom area of one cargo, the height of the carrier, the quantity of the cargoes filling one layer, the total height of the carrier and the set of cargoes, and the total area of the cargoes on the topmost layer as follows. A quantity of layers of the set of cargoes is determined according to the height of one cargo, the height of the carrier, and the total height of the carrier and the set of cargoes. A quantity of the cargoes on the topmost layer is determined according to the total area of the cargoes on the topmost layer and the bottom area of one cargo. The quantity of the set of cargoes is determined according to the quantity of the layers of the set of cargoes, the quantity of the cargoes filling one layer, and the quantity of the cargoes on the topmost layer.

In an implementation, the quantity of the set of cargoes is determined according to the height of one cargo, the height of the carrier, the quantity of the cargoes filling one layer, and the total height of the carrier and the set of cargoes as follows. A quantity of layers of the set of cargoes is determined according to the height of one cargo, the height of the carrier, and the total height of the carrier and the set of cargoes. The quantity of the set of cargoes is determined according to the quantity of the layers of the set of cargoes and the quantity of the cargoes filling one layer.

In an implementation, by performing point cloud voxel gridding on the 3D point cloud data, the total area of the cargoes on the topmost layer and the total height of the carrier and the set of cargoes are determined.

It should be noted that, in the disclosure, the total area of the cargoes on the topmost layer as well as the total height of the carrier and the set of cargoes are determined by analyzing the complete 3D point cloud data of the set of cargoes, while physical data of the cargo and physical data of the carrier (e.g., a height and a bottom area of one cargo, a height of the carrier, and a quantity of cargoes filling one layer) can be known in advance.

Specifically, (1) the processor determines a height h and a bottom area s of one cargo, a height a of the carrier, and a quantity n of cargoes filling one layer, and determines a height H of the carrier and the set of cargoes as well as a total area S of cargoes on a topmost layer according to gridded image obtained by performing voxel gridding on 3D point cloud data of the carrier and the set of cargoes. (2) The processor determines whether the total area S of the cargoes on the topmost layer is smaller than an area threshold $T_s$, where the area threshold $T_s$ is obtained by multiplying the bottom area s of one cargo by the quantity n of the cargoes filling one layer. (3) If the total area S is less than the area threshold $T_s$, the processor determines a quantity of layers w of the set of cargoes by substituting the height h of one cargo, the height a of the carrier, and the height H of the carrier and the set of cargoes into a formula w=(H−a)/h; the processor determines a quantity n' of the cargoes on the topmost layer by substituting the total area S of the cargoes on the topmost layer and the bottom area s of one cargo into a formula n'=S/s; the processor determines the quantity N of the set of cargoes by substituting the quantity of layers w of the set of cargoes, the quantity n of the cargoes filling one layer, and the quantity n' of the cargoes on the topmost layer into a formula N=(w−1)·n+n'. (4) If the total area S is equal to the area threshold $T_s$, the processor determines a quantity of layers w of the set of cargoes by substituting the height h of one cargo, the height a of the carrier, and the height H of the carrier and the set of cargoes into a formula w=(H−a)/h; the processor determines the quantity N of the set of cargoes by substituting the quantity of layers w of the set of cargoes and the quantity n of the cargoes filling one layer into a formula N=w·n.

In an implementation, the set of cargoes are carried on a carrier. The 3D point cloud data of the set of cargoes is obtained as follows. The 3D point cloud data of the carrier and the set of cargoes is obtained. The quantity of the set of cargoes is calculated as follows.

At 302, point cloud voxel gridding is performed on the 3D point cloud data to obtain a total area of cargoes on a topmost layer and a total height of the carrier and the set of cargoes.

The voxel gridding refers to converting geometric representation of an object into a voxel representation closest to the object, and a voxel grid is a form of regular 3D grid for representing a cargo, which can be regarded as contrast of a two-dimensional (2D) pixel on 3D.

Specifically, the processor performs voxel gridding on the 3D point cloud data to obtain a gridded image, and obtains, according to the gridded image, the total height of the carrier and the set of cargoes as well as the total area of the cargoes on the topmost layer.

At 304, a height and a bottom area of one cargo, a height of the carrier, and a quantity of cargoes filling one layer are obtained.

Specifically, the processor obtains the height and the bottom area of one cargo, the height of the carrier, and the quantity of the cargoes filling one layer.

At 306, a quantity of the cargoes on the topmost layer is determined according to the total area of the cargoes on the topmost layer and the bottom area of one cargo.

Specifically, the processor determines the quantity of the cargoes on the topmost layer according to the total area of the cargoes on the topmost layer and the bottom area of one cargo. The quantity of the cargoes on the topmost layer can be calculated according to a formula n'=S/s, where n' represents the quantity of the cargoes on the topmost layer, S represents the total area of the cargoes on the topmost layer, and s represents the bottom area of one cargo.

At 308, a quantity of layers of the set of cargoes is determined according to the total height of the carrier and the set of cargoes, the height of the carrier, and the height of one cargo.

Specifically, the processor determines the quantity of the layers of the set of cargoes according to the total height of the carrier and the set of cargoes, the height of the carrier, and the height of one cargo. The quantity of the layers of the set of cargoes can be calculated according to a formula w=(H−a)/h, where w represents the quantity of the layers of the set of cargoes, H represents the total height of the carrier and the set of cargoes, h represents the height of one cargo, and a represents the height of the carrier.

At 310, a total quantity of the set of cargoes is determined according to the quantity of the layers of the set of cargoes, the quantity of the cargoes filling one layer, and the quantity of the cargoes on the topmost layer.

Specifically, the processor determines the total quantity of the set of cargoes according to the quantity of the layers of the set of cargoes, the quantity of the cargoes filling one layer, and the quantity of the cargoes on the topmost layer. The total quantity of the set of cargoes can be calculated according to a formula N=(w−1)·n+n', where N represents the total quantity of the set of cargoes, w represents the quantity of the layers of the set of cargoes, n represents the quantity of the cargoes filling one layer, and n' represents the quantity of the cargoes on the topmost layer.

It should be noted that, in the disclosure, the above operations may be performed in an order different from the description. For example, two operations with consecutive reference numbers (e.g., operations at 302 and 304) may be performed substantially in parallel, or may sometimes be performed in reverse order, which is not limited in the disclosure.

In these implementations, the total quantity of the set of cargoes (e.g., bulk-cargoes) can be calculated by analyzing the obtained 3D point cloud data and obtaining relevant physical data of the set of cargoes and the carrier. As such, counting of the set of cargoes can be realized, and efficiency of the counting of the set of cargoes can be improved.

In an implementation, after obtaining the 3D point cloud data of the set of cargoes within the preset placement region based on the cargo-counting instruction, the method further includes the following. The 3D point cloud data is preprocessing to obtain preprocessed 3D point cloud data. Whether the set of cargoes are in the first placement state is determined according to the 3D point cloud data as follows. Whether the set of cargoes are in the first placement state is determined according to the preprocessed 3D point cloud data.

The preprocessing of the 3D point cloud data refers to using valid point cloud information (excluding data that is not conducive to subsequent data analysis) for 3D reconstruction, that is, processing the 3D point cloud data of the set of cargoes within the preset placement region. In an implementation, preprocessing the 3D point cloud data includes removal of redundant data, filtering out of an isolated point, point cloud data reduction, and point cloud data registration. The removal of the redundant data refers to removing data that appears repeatedly. The filtering out of the isolated point refers to filtering out an isolated point. The point cloud data reduction refers to compressing the point cloud data to make the compressed data has a smaller size without changing contents of original data. The point cloud data registration refers to performing registration on point cloud data collected by different scanners through a registration algorithm based on exhaustive search and a registration algorithm based on feature matching.

Specifically, the processor preprocesses the 3D point cloud data, and then determines whether the set of cargoes are in the first placement state according to the preprocessed 3D point cloud data.

In these implementations, accurate 3D point cloud data can be obtained by preprocessing the 3D point cloud data, which can improve accuracy of judging whether the set of cargoes are in the first placement state.

In an implementation, the 3D point cloud data is preprocessed to obtain preprocessed 3D point cloud data as follows. Out-of-area point cloud filtering, ground-plane point cloud filtering, and point cloud filtering are performed on the 3D point cloud data to obtain the preprocessed 3D point cloud data, where the out-of-area point cloud filtering is to filter out point cloud data beyond the preset placement region; the ground-plane point cloud filtering is to filter out point cloud data of the ground plane to leave point cloud data of the set of cargoes; the point cloud filtering is to filter out a hash point or an isolated point in the 3D point cloud data.

The ground-plane point cloud filtering is to use random sample consensus (RANSAC) to fit a ground plane equation to obtain a point to-be-filtered, and then to filter out point cloud data containing the ground plane while leaving point cloud data of the set of cargoes. The point cloud filtering is to use statistical filtering based on Gaussian distribution to filter out a hash point and an isolated point in the point cloud data.

Specifically, the processor preprocesses the 3D point cloud data through the out-of-area point cloud filtering, the ground-plane point cloud filtering, and the point cloud filtering.

In these implementations, accurate 3D point cloud data can be obtained by preprocessing the 3D point cloud data, which can improve accuracy of judging whether the set of cargoes are in the first placement state.

In the following, according to the method for cargo counting of implementations of the disclosure, cargo counting will be described with a detailed implementation.

(1) A server (e.g., a central control system) issues a cargo-delivery instruction to instruct an intelligent forklift to fork cargoes and place the cargoes into a preset placement region (e.g., a rectangular placement region) according to the cargo-delivery instruction, and receives feedback information after the intelligent forklift completes cargo delivery.

(2) The central control system issues a cargo-counting instruction (e.g., a bulk-cargo counting instruction), and collects information of the cargoes within the preset placement region with each of two 3D laser scanners mounted diagonally on the top of the cargoes, to obtain candidate point cloud data (e.g., target information) of the cargoes within the preset placement region.

(3) The central control system obtains position-and-attitude parameters of the two 3D laser scanners.

(4) Based on the position-and-attitude parameters of the two 3D laser scanners, the central control system converts the candidate point cloud data of the cargoes within the preset placement region collected by the two 3D laser scanners, and combines the converted point cloud data into a complete 3D point cloud data of the cargoes (e.g., laser point cloud data).

(5) The central control system performs a series of preprocessing (e.g., out-of-area point cloud filtering, ground-plane point cloud filtering, and point cloud filtering) on the complete laser point cloud data.

(6) The central control system projects the preprocessed laser point cloud data onto a ground plane to obtain a statistics-based grid map; the central control system processes the grid map through a Hough straight line detection algorithm to obtain multiple straight line equations; if a straight line slope of each of the multiple straight line equations is equal to 0 or 1, placement of the cargoes is determined to belong to standard placement, that is, the cargoes are determined to be in a first placement state; otherwise, the placement of the cargoes is determined to belong to non-standard placement, that is, the cargoes are determined to be in a second placement state; based on a determination that the cargoes are in the second placement state, the central control system instructs the intelligent forklift to deliver the cargoes (e.g., bulk-cargoes) to an abnormal region.

(7) In response to detecting that the bulk-cargoes are in the first placement state, the central control system performs point cloud voxel gridding on the laser point cloud data to obtain a height H of a carrier and the cargoes as well as a total area S of cargoes on a topmost layer (e.g., a total area of bulk-cargoes on a topmost layer).

(8) The central control system obtains a height h and a bottom area s of one cargo, a height a of a carrier (e.g., a pallet), and a quantity n of cargoes filling one layer; the central control system calculates a quantity of layers of the cargoes (e.g., a quantity of layers of bulk-cargoes) according to a formula w=(H−a)/h, calculates a quantity of the cargoes on the topmost layer (e.g., a quantity of the bulk-cargoes on the topmost layer) according to a formula n'=S/s, and calculates a total quantity of the cargoes (e.g., a total quantity of the bulk-cargoes) according to a formula N=(w−1)·n+n'.

It should be understood that, although the operations in the flowcharts involved in the above implementations are described sequentially according to arrows, these operations are not necessarily executed sequentially according to the arrows. Unless explicitly stated herein, execution of these operations is not strictly limited to the order, and the operations may be executed in other orders. Moreover, at least part of the operations in the flowcharts involved in the above implementations may include multiple operations or stages, and these operations or stages are not necessarily executed and completed at the same time, but may be performed at different times. Execution of these operations or stages is not necessarily sequential, but may be performed in turn or alternately with other operations or at least part of operations or stages in other operations.

Based on the same inventive concept, implementations of the disclosure further provides a device for cargo counting configured to implement the above method for cargo counting. Since an implementation scheme of the device is similar to an implementation scheme of the above method, one or more implementations of the device for cargo counting provided below can refer to the above method for cargo counting, which will not be repeated herein.

Figure 5:
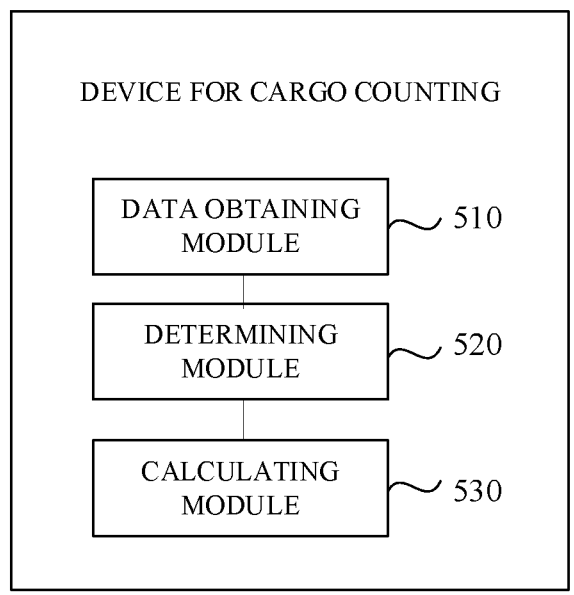
FIG. 5 is a block diagram illustrating a structure of a device for cargo counting according to an implementation of the disclosure.

In the implementations of the disclosure, a device for cargo counting is provided. As illustrated in FIG. 5, the device for cargo counting includes a data obtaining module 510, a determining module 520, and a calculating module 530. The data obtaining module 510 is configured to obtain 3D point cloud data of a set of cargoes within a preset placement region based on a cargo-counting instruction. The determining module 520 is configured to determine whether the set of cargoes are in a first placement state according to the 3D point cloud data. The calculating module 530 is configured to calculate a quantity of the set of cargoes based on a determination that the set of cargoes are in the first placement state.

In an implementation, the data obtaining module 510 configured to obtain the 3D point cloud data of the set of cargoes within the preset placement region based on the cargo-counting instruction is specifically configured to: obtain candidate point cloud data of the set of cargoes within the preset placement region with at least two 3D laser scanners, and combine the candidate point cloud data obtained by each of the at least two 3D laser scanners, to obtain the 3D point cloud data of the set of cargoes.

In an implementation, the data obtaining module 510 configured to obtain the candidate point cloud data of the set of cargoes within the preset placement region with the at least two 3D laser scanners is specifically configured to: obtain candidate point cloud data of the set of cargoes within the preset placement region with a first scanner, and obtain candidate point cloud data of the set of cargoes within the preset placement region with each of at least one second scanner, where the first scanner is a reference scanner.

In an implementation, the data obtaining module 510 configured to combine the candidate point cloud data obtained by each of the at least two 3D laser scanners to obtain the 3D point cloud data of the set of cargoes is specifically configured to: for each of the at least one second scanner, obtain a position-and-attitude parameter of the second scanner relative to the first scanner; based on the position-and-attitude parameter of each of the at least one second scanner relative to the first scanner, perform translation-and-rotation transformation on the candidate point cloud data of the set of cargoes within the preset placement region obtained by each of the at least one second scanner to obtain 3D point cloud data in a coordinate system of the first scanner; and combine all 3D point cloud data in the coordinate system of the first scanner and the candidate point cloud data of the set of cargoes within the preset placement region obtained by the first scanner, to obtain the 3D point cloud data of the set of cargoes.

In an implementation, the device for cargo counting further includes a detecting module. The detecting module is configured to: project the 3D point cloud data onto a ground plane to obtain a statistics-based grid map; perform straight line detection on the grid map to obtain multiple straight line equations; and determine that the set of cargoes are in the first placement state on condition that a straight line slope of each of the multiple straight line equations is equal to 0 or 1.

In an implementation, the set of cargoes are carried on a carrier. The data obtaining module 510 configured to obtain the 3D point cloud data of the set of cargoes is configured to obtain the 3D point cloud data of the carrier and the set of cargoes. The data obtaining module 510 is further configured to: obtain a total height of the carrier and the set of cargoes and a total area of cargoes on a topmost layer by performing point cloud voxel gridding on the 3D point cloud data; and obtain a height and a bottom area of one cargo, a height of the carrier, and a quantity of cargoes filling one layer. The calculating module 530 is configured to: determine a quantity of the cargoes on the topmost layer according to the total area of the cargoes on the topmost layer and the bottom area of one cargo; determine a quantity of layers of the set of cargoes according to the height of one cargo, the height of the carrier, and the total height of the carrier and the set of cargoes; and determine the quantity of the set of cargoes according to the quantity of the layers of the set of cargoes, the quantity of the cargoes filling one layer, and the quantity of the cargoes on the topmost layer.

In an implementation, the set of cargoes are carried on a carrier. The data obtaining module 510 configured to obtain the 3D point cloud data of the set of cargoes is configured to obtain the 3D point cloud data of the carrier and the set of cargoes. The data obtaining module 510 is further configured to: determine a height and a bottom area of one cargo, a height of the carrier, a quantity of cargoes filling one layer, a total height of the carrier and the set of cargoes, and a total area of cargoes on a topmost layer. The calculating module 530 is configured to: determine whether the total area of the cargoes on the topmost layer is less than an area threshold, wherein the area threshold is obtained by multiplying the bottom area of one cargo and the quantity of the cargoes filling one layer; determine the quantity of the set of cargoes according to the height and the bottom area of one cargo, the height of the carrier, the quantity of the cargoes filling one layer, the total height of the carrier and the set of cargoes, and the total area of the cargoes on the topmost layer, based on a determination that the total area of the cargoes on the topmost layer is less than the area threshold; and determine the quantity of the set of cargoes according to the height of one cargo, the height of the carrier, the quantity of the cargoes filling one layer, and the total height of the carrier and the set of cargoes, based on a determination that the total area of the cargoes on the topmost layer is equal to the area threshold.

In an implementation, the calculating module 530 is configured to: based on a determination that the total area of the cargoes on the topmost layer is less than the area threshold, determine a quantity of layers of the set of cargoes according to the height of one cargo, the height of the carrier, and the total height of the carrier and the set of cargoes; determine a quantity of the cargoes on the topmost layer according to the total area of the cargoes on the topmost layer and the bottom area of one cargo; and determine the quantity of the set of cargoes according to the quantity of the layers of the set of cargoes, the quantity of the cargoes filling one layer, and the quantity of the cargoes on the topmost layer.

In an implementation, the calculating module 530 is configured to: based on a determination that the total area of the cargoes on the topmost layer is equal to the area threshold, determine a quantity of layers of the set of cargoes according to the height of one cargo, the height of the carrier, and the total height of the carrier and the set of cargoes; and determine the quantity of the set of cargoes according to the quantity of the layers of the set of cargoes and the quantity of the cargoes filling one layer.

In an implementation, the total height of the carrier and the set of cargoes and the total area of the cargoes on the topmost layer are determined by performing point cloud voxel gridding on the 3D point cloud data.

In an implementation, the device for cargo counting further includes a preprocessing module. The preprocessing module is configured to preprocess the 3D point cloud data to obtain preprocessed 3D point cloud data. The determining module 520 configured to determine whether the set of cargoes are in the first placement state according to the 3D point cloud data is configured to: determine whether the set of cargoes are in the first placement state according to the preprocessed 3D point cloud data.

In an implementation, the preprocessing module is configured to perform out-of-area point cloud filtering, ground-plane point cloud filtering, and point cloud filtering on the 3D point cloud data to obtain the preprocessed 3D point cloud data, where the out-of-area point cloud filtering is to filter out point cloud data beyond the preset placement region; the ground-plane point cloud filtering is to filter out point cloud data of the ground plane to leave point cloud data of the set of cargoes; the point cloud filtering is to filter out a hash point or an isolated point in the 3D point cloud data.

It should be understood that, the device/equipment disclosed in implementations provided herein may be implemented in other manners. For example, the device implementations described above are merely illustrative; for instance, the division of the unit/module is only a logical function division and there can be other manners of division during actual implementations, for example, multiple units or assemblies may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be electrical connection or other forms of connection.

Each module in the above device for cargo counting may be implemented in whole or in part by software, hardware and combinations thereof. The above modules may be embedded in or independent of the processor in the computer equipment in the form of hardware, or stored in the memory in the computer equipment in the form of software, so that the processor can call and execute operations corresponding to the above modules.

Figure 6:
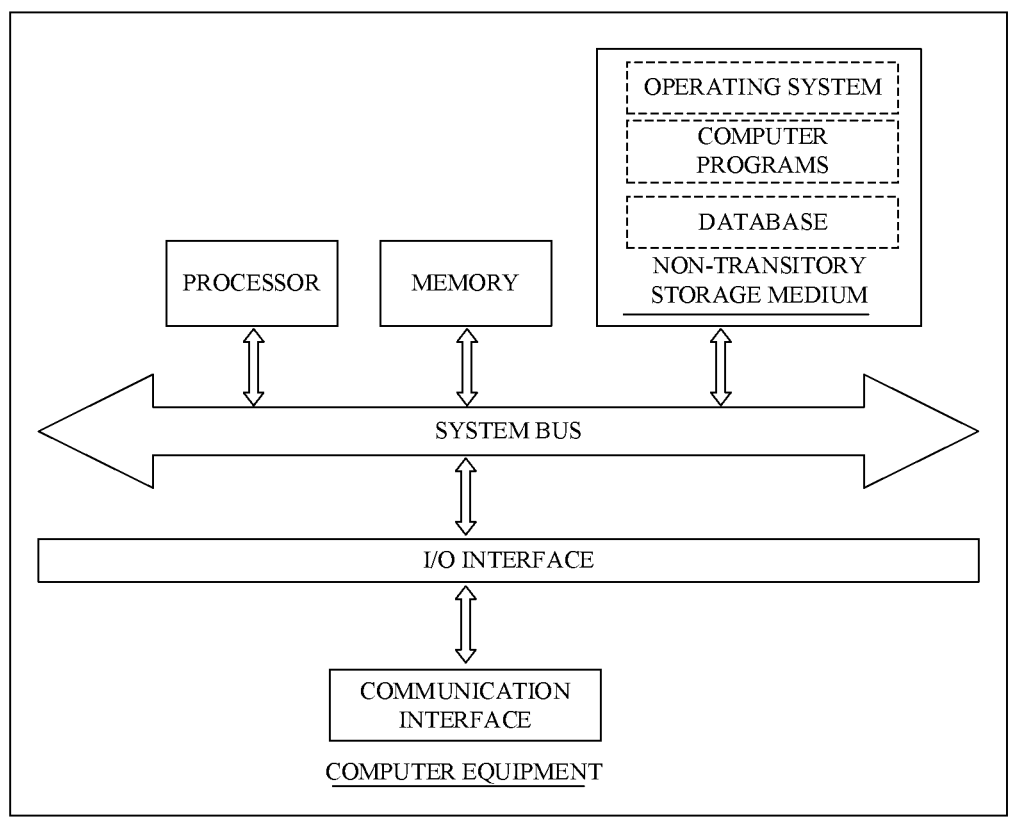
FIG. 6 is a diagram illustrating an internal structure of a computer equipment according to an implementation of the disclosure.

In implementations of the disclosure, a computer equipment is provided. The computer equipment may be a server, and its internal structure diagram is illustrated in FIG. 6. The computer equipment includes a processor, a memory, and a network interface connected to each other through a system bus. The processor of the computer equipment is configured to provide computing and control capabilities. The memory of the computer equipment includes a non-transitory storage medium and an internal memory, where the non-transitory storage medium stores an operating system, computer programs, and a database, and the internal memory provides an environment for execution of the operating system and the computer programs in the non-transitory storage medium. The database of the computer equipment is used to store point cloud data of cargoes. The network interface of the computer equipment is used to communicate with an external terminal through a network connection. The computer programs, when executed by the processor, are operable to execute the foregoing method for cargo counting.

Those of ordinary skill in the art can understand that, the structure illustrated in FIG. 6 is only a block diagram of a partial structure related to the solution of the disclosure, which does not constitute a limitation on the computer equipment to which the solution of the disclosure is applied. The computer equipment may include more or fewer components than accompanying drawings, or combine certain components, or have a different arrangement of components.

In implementations of the disclosure, a computer equipment is provided. The computer equipment includes a memory and a processor. The memory is coupled to the processor and stores computer programs which, when executed by the processor, cause the processor to: obtain 3D point cloud data of a set of cargoes within a preset placement region based on a cargo-counting instruction; determine whether the set of cargoes are in a first placement state according to the 3D point cloud data; and calculate a quantity of the set of cargoes based on a determination that the set of cargoes are in the first placement state.

In an implementation, in terms of obtaining the 3D point cloud data of the set of cargoes within the preset placement region based on the cargo-counting instruction, the processor is configured to: obtain candidate point cloud data of the set of cargoes within the preset placement region with at least two 3D laser scanners; and combine the candidate point cloud data obtained by each of the at least two 3D laser scanners, to obtain the 3D point cloud data of the set of cargoes.

In an implementation, in terms of obtaining the 3D point cloud data of the set of cargoes within the preset placement region based on the cargo-counting instruction, the processor is configured to: obtain candidate point cloud data of the set of cargoes within the preset placement region with a first scanner, and obtain candidate point cloud data of the set of cargoes within the preset placement region with each of at least one second scanner, where the first scanner is a reference scanner; for each of the at least one second scanner, obtain a position-and-attitude parameter of the second scanner relative to the first scanner; based on the position-and-attitude parameter of each of the at least one second scanner relative to the first scanner, perform translation-and-rotation transformation on the candidate point cloud data of the set of cargoes within the preset placement region obtained by each of the at least one second scanner to obtain 3D point cloud data in a coordinate system of the first scanner; and combine all 3D point cloud data in the coordinate system of the first scanner and the candidate point cloud data of the set of cargoes within the preset placement region obtained by the first scanner, to obtain the 3D point cloud data of the set of cargoes.

In an implementation, in terms of determining whether the set of cargoes are in the first placement state according to the 3D point cloud data, the processor is configured to: project the 3D point cloud data onto a ground plane to obtain a statistics-based grid map; perform straight line detection on the grid map to obtain multiple straight line equations; and determine that the set of cargoes are in the first placement state on condition that a straight line slope of each of the multiple straight line equations is equal to 0 or 1.

In an implementation, the set of cargoes are carried on a carrier. In terms of obtaining the 3D point cloud data of the set of cargoes, the processor is configured to obtain the 3D point cloud data of the carrier and the set of cargoes. In terms of calculating the quantity of the set of cargoes, the processor is configured to: perform point cloud voxel gridding on the 3D point cloud data to obtain a total height of the carrier and the set of cargoes and a total area of cargoes on a topmost layer; obtain a height and a bottom area of one cargo, a height of the carrier, and a quantity of cargoes filling one layer; determine a quantity of the cargoes on the topmost layer according to the total area of the cargoes on the topmost layer and the bottom area of one cargo; determine a quantity of layers of the set of cargoes according to the height of one cargo, the height of the carrier, and the total height of the carrier and the set of cargoes; and determine the quantity of the set of cargoes according to the quantity of the layers of the set of cargoes, the quantity of the cargoes filling one layer, and the quantity of the cargoes on the topmost layer.

In an implementation, the set of cargoes are carried on a carrier. In terms of obtaining the 3D point cloud data of the set of cargoes, the processor is configured to obtain the 3D point cloud data of the carrier and the set of cargoes. In terms of calculating the quantity of the set of cargoes, the processor is configured to: determine a height and a bottom area of one cargo, a height of the carrier, a quantity of cargoes filling one layer, a total height of the carrier and the set of cargoes, and a total area of cargoes on a topmost layer; determine whether the total area of the cargoes on the topmost layer is less than an area threshold, wherein the area threshold is obtained by multiplying the bottom area of one cargo and the quantity of the cargoes filling one layer; determine the quantity of the set of cargoes according to the height and the bottom area of one cargo, the height of the carrier, the quantity of the cargoes filling one layer, the total height of the carrier and the set of cargoes, and the total area of the cargoes on the topmost layer, based on a determination that the total area of the cargoes on the topmost layer is less than the area threshold; and determine the quantity of the set of cargoes according to the height of one cargo, the height of the carrier, the quantity of the cargoes filling one layer, and the total height of the carrier and the set of cargoes, based on a determination that the total area of the cargoes on the topmost layer is equal to the area threshold.

In an implementation, in terms of determining the quantity of the set of cargoes according to the height and the bottom area of one cargo, the height of the carrier, the quantity of the cargoes filling one layer, the total height of the carrier and the set of cargoes, and the total area of the cargoes on the topmost layer, the processor is configured to: determine a quantity of layers of the set of cargoes according to the height of one cargo, the height of the carrier, and the total height of the carrier and the set of cargoes; determine a quantity of the cargoes on the topmost layer according to the total area of the cargoes on the topmost layer and the bottom area of one cargo; and determine the quantity of the set of cargoes according to the quantity of the layers of the set of cargoes, the quantity of the cargoes filling one layer, and the quantity of the cargoes on the topmost layer.

In an implementation, in terms of determining the quantity of the set of cargoes according to the height of one cargo, the height of the carrier, the quantity of the cargoes filling one layer, and the total height of the carrier and the set of cargoes, the processor is configured to: determine a quantity of layers of the set of cargoes according to the height of one cargo, the height of the carrier, and the total height of the carrier and the set of cargoes; and determine the quantity of the set of cargoes according to the quantity of the layers of the set of cargoes and the quantity of the cargoes filling one layer.

In an implementation, the total height of the carrier and the set of cargoes and the total area of the cargoes on the topmost layer are determined by performing point cloud voxel gridding on the 3D point cloud data.

In an implementation, after obtaining the 3D point cloud data of the set of cargoes within the preset placement region based on the cargo-counting instruction, the processor is further configured to preprocess the 3D point cloud data to obtain preprocessed 3D point cloud data. In terms of determining whether the set of cargoes are in the first placement state according to the 3D point cloud data, the processor is configured to determine whether the set of cargoes are in the first placement state according to the preprocessed 3D point cloud data.

In an implementation, in terms of preprocessing the 3D point cloud data to obtain the preprocessed 3D point cloud data, the processor is configured to perform out-of-area point cloud filtering, ground-plane point cloud filtering, and point cloud filtering on the 3D point cloud data to obtain the preprocessed 3D point cloud data, where the out-of-area point cloud filtering is to filter out point cloud data beyond the preset placement region; the ground-plane point cloud filtering is to filter out point cloud data of the ground plane to leave point cloud data of the set of cargoes; the point cloud filtering is to filter out a hash point or an isolated point in the 3D point cloud data.

In implementations of the disclosure, a non-transitory computer-readable storage medium is provided. The non-transitory computer-readable storage medium is configured to store computer programs which, when executed by a processor, cause the processor to execute the method for cargo counting of implementations of the disclosure.

In implementations of the disclosure, a computer program product is provided. The computer program product includes computer programs which are operable with a processor to execute all or part of the operations of the method for cargo counting described in the foregoing method implementations. The computer program product may be a software installation package.

In the foregoing implementations, the description of each implementation has its own emphasis. For the parts not described in detail in one implementation, reference may be made to related descriptions in other implementations.

Various aspects of the disclosure are described herein with reference to flowcharts and/or block diagrams of the method and device, the computer equipment, and the storage medium according to implementations of the disclosure. It will be understood that, each block of the flowcharts and/or the block diagrams as well as combinations of blocks in the flowcharts and/or the block diagrams can be implemented through computer-readable program instructions.

It should be noted that, user information (including but not limited to user equipment information, user personal information, etc.) and data (including but not limited to data for analysis, stored data, illustrated data, etc.) involved in the disclosure are all information and data authorized by a user or fully authorized by the parties.

Those of ordinary skill in the art can understand that, all or part of processes in the method of the foregoing implementations may be accomplished by means of a computer program to instruct associated hardware, and the computer program can be stored in a non-transitory computer-readable storage medium. The computer program, when executed, may be operable to execute processes of the foregoing method implementations. Any reference to a memory, a database, or other media used in various implementations of the disclosure may include at least one of a non-transitory memory and a transitory memory. The non-transitory memory may include a read-only memory (ROM), magnetic tape, a floppy disk, a flash memory, an optical memory, a high-density embedded non-transitory memory, resistive memory (ReRAM), a magnetoresistive random access memory (MRAM), a ferroelectric RAM (FRAM), a phase change memory (PCM), a graphene memory, etc. The transitory memory may include a RAM or an external cache memory, etc. By way of illustration and not limitation, the RAM may be in various forms, such as a static RAM (SRAM) or a dynamic RAM (DRAM). The database involved in the various implementations of the disclosure may include at least one of a relational database and a non-relational database. The non-relational database may include a blockchain-based distributed database, etc., which is not limited herein. The processor involved in the various implementations of the disclosure may be a general-purpose processor, a central processing unit, a graphics processor, a digital signal processor, a programmable logic device, a data processing logic device based on quantum computing, etc., which is not limited herein.

The technical features of the foregoing implementations can be combined arbitrarily. For the sake of brevity, not all possible combinations of the technical features in the foregoing implementations are described. However, as long as there is no contradiction in the combination of these technical features, all these combinations should be considered to fall within the scope of this specification.

The above merely describes some implementations of the disclosure, and the description of these implementations is relatively specific and detailed, but this should not be construed as a limitation on the scope of the disclosure. It should be pointed out that, for those of ordinary skill in the art, several modifications and improvements may be made without departing from the concept of the disclosure, which all shall belong to the protection scope of the disclosure. Therefore, the scope of protection of the disclosure should be determined by the appended claims.

What is claimed is:

1. A method for cargo counting, comprising:
    obtaining three-dimensional (3D) point cloud data of a set of cargoes within a preset placement region based on a cargo-counting instruction;
    determining whether the set of cargoes are in a first placement state according to the 3D point cloud data; and
    calculating a quantity of the set of cargoes, based on a determination that the set of cargoes are in the first placement state;
    wherein determining whether the set of cargoes are in the first placement state according to the 3D point cloud data comprises:
        projecting the 3D point cloud data onto a ground plane to obtain a statistics-based grid map;
        performing straight line detection on the grid map to obtain a plurality of straight line equations; and
        determining that the set of cargoes are in the first placement state, on condition that a straight line slope of each of the plurality of straight line equations is equal to 0 or 1.

2. The method of claim 1, wherein obtaining the 3D point cloud data of the set of cargoes within the preset placement region based on the cargo-counting instruction comprises:
    obtaining candidate point cloud data of the set of cargoes within the preset placement region with at least two 3D laser scanners; and
    combining the candidate point cloud data obtained by each of the at least two 3D laser scanners, to obtain the 3D point cloud data of the set of cargoes.

3. The method of claim 2, wherein the at least two 3D laser scanners comprise a first scanner and at least one second scanner, and obtaining the candidate point cloud data of the set of cargoes within the preset placement region with the at least two 3D laser scanners comprises:
    obtaining candidate point cloud data of the set of cargoes within the preset placement region with the first scanner, wherein the first scanner is a reference scanner; and
    obtaining candidate point cloud data of the set of cargoes within the preset placement region with each of the at least one second scanner.

4. The method of claim 3, wherein combining the candidate point cloud data obtained by each of the at least two 3D laser scanners to obtain the 3D point cloud data of the set of cargoes comprises:
    for each of the at least one second scanner, obtaining a position-and-attitude parameter of the second scanner relative to the first scanner;
    based on the position-and-attitude parameter of each of the at least one second scanner relative to the first scanner, performing translation-and-rotation transformation on the candidate point cloud data of the set of cargoes within the preset placement region obtained by each of the at least one second scanner to obtain 3D point cloud data in a coordinate system of the first scanner; and
    combining all 3D point cloud data in the coordinate system of the first scanner and the candidate point cloud data of the set of cargoes within the preset placement region obtained by the first scanner, to obtain the 3D point cloud data of the set of cargoes.

5. The method of claim 1, wherein the set of cargoes are carried on a carrier, wherein
    obtaining the 3D point cloud data of the set of cargoes comprises:
        obtaining the 3D point cloud data of the carrier and the set of cargoes; and
    calculating the quantity of the set of cargoes comprises:
        determining a height and a bottom area of one cargo, a height of the carrier, a quantity of cargoes filling one layer, a total height of the carrier and the set of cargoes, and a total area of cargoes on a topmost layer;
        determining whether the total area of the cargoes on the topmost layer is less than an area threshold, wherein the area threshold is obtained by multiplying the bottom area of one cargo and the quantity of the cargoes filling one layer;

determining the quantity of the set of cargoes according to the height and the bottom area of one cargo, the height of the carrier, the quantity of the cargoes filling one layer, the total height of the carrier and the set of cargoes, and the total area of the cargoes on the topmost layer, based on a determination that the total area of the cargoes on the topmost layer is less than the area threshold; and determining the quantity of the set of cargoes according to the height of one cargo, the height of the carrier, the quantity of the cargoes filling one layer, and the total height of the carrier and the set of cargoes, based on a determination that the total area of the cargoes on the topmost layer is equal to the area threshold.

6. The method of claim 5, wherein determining the quantity of the set of cargoes according to the height and the bottom area of one cargo, the height of the carrier, the quantity of the cargoes filling one layer, the total height of the carrier and the set of cargoes, and the total area of the cargoes on the topmost layer comprises:

determining a quantity of layers of the set of cargoes according to the height of one cargo, the height of the carrier, and the total height of the carrier and the set of cargoes;

determining a quantity of the cargoes on the topmost layer according to the total area of the cargoes on the topmost layer and the bottom area of one cargo; and determining the quantity of the set of cargoes according to the quantity of the layers of the set of cargoes, the quantity of the cargoes filling one layer, and the quantity of the cargoes on the topmost layer.

7. The method of claim 5, wherein determining the quantity of the set of cargoes according to the height of one cargo, the height of the carrier, the quantity of the cargoes filling one layer, and the total height of the carrier and the set of cargoes comprises:

determining a quantity of layers of the set of cargoes according to the height of one cargo, the height of the carrier, and the total height of the carrier and the set of cargoes; and determining the quantity of the set of cargoes according to the quantity of the layers of the set of cargoes and the quantity of the cargoes filling one layer.

8. The method of claim 5, wherein the total height of the carrier and the set of cargoes and the total area of the cargoes on the topmost layer are determined by performing point cloud voxel gridding on the 3D point cloud data.

9. The method of claim 1, wherein the set of cargoes are carried on a carrier, wherein obtaining the 3D point cloud data of the set of cargoes comprises:

obtaining the 3D point cloud data of the carrier and the set of cargoes; and calculating the quantity of the set of cargoes comprises:

performing point cloud voxel gridding on the 3D point cloud data to obtain a total height of the carrier and the set of cargoes and a total area of cargoes on a topmost layer;

obtaining a height and a bottom area of one cargo, a height of the carrier, and a quantity of cargoes filling one layer;

determining a quantity of the cargoes on the topmost layer according to the total area of the cargoes on the topmost layer and the bottom area of one cargo;

determining a quantity of layers of the set of cargoes according to the height of one cargo, the height of the carrier, and the total height of the carrier and the set of cargoes; and determining the quantity of the set of cargoes according to the quantity of the layers of the set of cargoes, the quantity of the cargoes filling one layer, and the quantity of the cargoes on the topmost layer.

10. The method of claim 1, wherein the method further comprises:

preprocessing the 3D point cloud data to obtain preprocessed 3D point cloud data, after obtaining the 3D point cloud data of the set of cargoes within the preset placement region based on the cargo-counting instruction; and determining whether the set of cargoes are in the first placement state according to the 3D point cloud data comprises:

determining whether the set of cargoes are in the first placement state according to the preprocessed 3D point cloud data.

11. The method of claim 10, wherein preprocessing the 3D point cloud data to obtain the preprocessed 3D point cloud data comprises:

performing out-of-area point cloud filtering, ground-plane point cloud filtering, and point cloud filtering on the 3D point cloud data to obtain the preprocessed 3D point cloud data, wherein the out-of-area point cloud filtering is to filter out point cloud data beyond the preset placement region; the ground-plane point cloud filtering is to filter out point cloud data of the ground plane to leave point cloud data of the set of cargoes; the point cloud filtering is to filter out a hash point or an isolated point in the 3D point cloud data.

12. A computer equipment, comprising:

a processor; and a memory, coupled to the processor and storing computer programs which, when executed by the processor, cause the processor to:

obtain three-dimensional (3D) point cloud data of a set of cargoes within a preset placement region based on a cargo-counting instruction;

determine whether the set of cargoes are in a first placement state according to the 3D point cloud data; and calculate a quantity of the set of cargoes, based on a determination that the set of cargoes are in the first placement state;

wherein the processor configured to determine whether the set of cargoes are in the first placement state according to the 3D point cloud data is configured to:

project the 3D point cloud data onto a ground plane to obtain a statistics-based grid map;

perform straight line detection on the grid map to obtain a plurality of straight line equations; and determine that the set of cargoes are in the first placement state, on condition that a straight line slope of each of the plurality of straight line equations is equal to 0 or 1.

13. The computer equipment of claim 12, wherein the processor configured to obtain the 3D point cloud data of the set of cargoes within the preset placement region based on the cargo-counting instruction is configured to:

obtain candidate point cloud data of the set of cargoes within the preset placement region with a first scanner, and obtain candidate point cloud data of the set of cargoes within the preset placement region with each of at least one second scanner, wherein the first scanner is a reference scanner;

for each of the at least one second scanner, obtain a position-and-attitude parameter of the second scanner relative to the first scanner;

based on the obtained position-and-attitude parameter of each of the at least one second scanner relative to the first scanner, perform translation-and-rotation transformation on the candidate point cloud data of the set of cargoes within the preset placement region obtained by each of the at least one second scanner to obtain 3D point cloud data in a coordinate system of the first scanner; and combine all obtained 3D point cloud data in the coordinate system of the first scanner and the candidate point cloud data of the set of cargoes within the preset placement region obtained by the first scanner, to obtain the 3D point cloud data of the set of cargoes.

14. The computer equipment of claim 12, wherein the set of cargoes are carried on a carrier,
wherein
the processor configured to obtain the 3D point cloud data of the set of cargoes is configured to:
obtain the 3D point cloud data of the carrier and the set of cargoes; and
the processor configured to calculate the quantity of the set of cargoes is configured to:
determine a height and a bottom area of one cargo, a height of the carrier, a quantity of cargoes filling one layer, a total height of the carrier and the set of cargoes, and a total area of cargoes on a topmost layer;
determine whether the total area of the cargoes on the topmost layer is less than an area threshold, wherein the area threshold is obtained by multiplying the bottom area of one cargo and the quantity of the cargoes filling one layer;
determine the quantity of the set of cargoes according to the height and the bottom area of one cargo, the height of the carrier, the quantity of the cargoes filling one layer, the total height of the carrier and the set of cargoes, and the total area of the cargoes on the topmost layer, based on a determination that the total area of the cargoes on the topmost layer is less than the area threshold; and
determine the quantity of the set of cargoes according to the height of one cargo, the height of the carrier, the quantity of the cargoes filling one layer, and the total height of the carrier and the set of cargoes, based on a determination that the total area of the cargoes on the topmost layer is equal to the area threshold.

15. The computer equipment of claim 14, wherein the processor configured to determine the quantity of the set of cargoes according to the height of one cargo, the height of the carrier, the quantity of the cargoes filling one layer, and the total height of the carrier and the set of cargoes is configured to:
determine a quantity of layers of the set of cargoes according to the height of one cargo, the height of the carrier, and the total height of the carrier and the set of cargoes; and
determine the quantity of the set of cargoes according to the quantity of the layers of the set of cargoes and the quantity of the cargoes filling one layer.

16. The computer equipment of claim 12, wherein the set of cargoes are carried on a carrier, wherein
the processor configured to obtain the 3D point cloud data of the set of cargoes is configured to:
obtain the 3D point cloud data of the carrier and the set of cargoes; and
the processor configured to calculate the quantity of the set of cargoes is configured to:
perform point cloud voxel gridding on the 3D point cloud data to obtain a total height of the carrier and the set of cargoes and a total area of cargoes on a topmost layer;
obtain a height and a bottom area of one cargo, a height of the carrier, and a quantity of cargoes filling one layer;
determine a quantity of the cargoes on the topmost layer according to the total area of the cargoes on the topmost layer and the bottom area of one cargo;
determine a quantity of layers of the set of cargoes according to the height of one cargo, the height of the carrier, and the total height of the carrier and the set of cargoes; and
determine the quantity of the set of cargoes according to the quantity of the layers of the set of cargoes, the quantity of the cargoes filling one layer, and the quantity of the cargoes on the topmost layer.

17. The computer equipment of claim 12, wherein the processor is further configured to:
preprocess the 3D point cloud data to obtain preprocessed 3D point cloud data, after obtaining the 3D point cloud data of the set of cargoes within the preset placement region based on the cargo-counting instruction; and
the processor configured to determine whether the set of cargoes are in the first placement state according to the 3D point cloud data is configured to:
determine whether the set of cargoes are in the first placement state according to the preprocessed 3D point cloud data.

18. A non-transitory computer-readable storage medium storing computer programs which, when executed by a processor, cause the processor to carry out actions, comprising:
obtaining three-dimensional (3D) point cloud data of a set of cargoes within a preset placement region based on a cargo-counting instruction;
determining whether the set of cargoes are in a first placement state according to the 3D point cloud data; and
calculating a quantity of the set of cargoes, based on a determination that the set of cargoes are in the first placement state;
wherein determining whether the set of cargoes are in the first placement state according to the 3D point cloud data comprises:
projecting the 3D point cloud data onto a ground plane to obtain a statistics-based grid map;
performing straight line detection on the grid map to obtain a plurality of straight line equations; and
determining that the set of cargoes are in the first placement state, on condition that a straight line slope of each of the plurality of straight line equations is equal to 0 or 1.

* * * * *